(12) United States Patent
Boguraev et al.

(10) Patent No.: US 7,937,338 B2
(45) Date of Patent: May 3, 2011

(54) SYSTEM AND METHOD FOR IDENTIFYING DOCUMENT STRUCTURE AND ASSOCIATED METAINFORMATION

(75) Inventors: Branimir K. Boguraev, Bedford, NY (US); Roy J. Byrd, Ossining, NY (US); Keh-Shin F. Cheng, Mahopac, NY (US); Anni R. Coden, Bronx, NY (US); Michael A. Tanenblatt, Nassau, NY (US); Wilfried Teiken, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 12/112,944

(22) Filed: Apr. 30, 2008

(65) Prior Publication Data
US 2009/0276378 A1 Nov. 5, 2009

(51) Int. Cl.
G06F 15/18 (2006.01)
G06F 17/20 (2006.01)
(52) U.S. Cl. ............... 706/12; 709/205; 715/234
(58) Field of Classification Search ............ 706/12
See application file for complete search history.

(56) References Cited

U.S. PATENT DOCUMENTS
2004/0006742 A1* 1/2004 Slocombe .............. 715/513
2008/0294723 A1* 11/2008 Daniels et al. ........... 709/205
* cited by examiner Primary Examiner — Donald Sparks
Assistant Examiner — Kalpana Bharadwaj
(74) Attorney, Agent, or Firm — Cahn & Samuels, LLP

(57) ABSTRACT

A system and method for processing documents by utilizing the textual content and layout of the documents, including visual indicators, to more efficiently and reliably process the documents across various document types. The system and method identifies visually distinguishable elements within the document, such as section and sub-section boundary indicators, to mark, divide and label the boundaries and content type such that the sections are more clearly identifiable and easily processed. The system and method uses known elements, including section heading types, keywords, section type classifiers, sub-section heading constructs, stop words, and the like to adaptively identify and process a broad range of document types. The system and method continually refines and updates these known elements and allows users to discover and define new elements for further refinement and updating.

21 Claims, 6 Drawing Sheets

SYSTEM AND METHOD FOR IDENTIFYING DOCUMENT STRUCTURE AND ASSOCIATED METAINFORMATION

I. FIELD OF THE INVENTION

This invention relates generally to a system and method for processing electronic document collections by utilizing the textual content and layout of the documents, including visual indicators, to more efficiently and reliably process the documents across various document types. More specifically, the present invention identifies and uses section and sub-section boundary indicators, and other known elements, such as section types, keywords, section type classifiers, sub-section heading constructs, stop words, and the like, to divide and adaptively process a wide range of document types.

II. BACKGROUND OF THE INVENTION

A common approach to "content analysis" applications that focus on text documents is to extract only the textual content from the documents for further analysis. These applications pay little attention to the document's visual layout or the document structure and its associated metadata, e.g. section heading level or prominence. However, very useful information is often conveyed via the visual layout of a document. For example, visual layout may be used to denote the start and/or end of a possibly untitled section or to highlight the most important point in a section or document.

Complementing the text content analysis with the information contained in the document's visual layout may greatly improve the performance of downstream content analysis. The success of certain text analysis technologies often depends on the application in the appropriate context. In these cases, successfully segmenting a document into identifiable sections and/or subsection blocks via cues, including visual indicators, and typing these sections in an application-specific and meaningful way is a crucial pre-processing step of subsequent text analysis.

The formats of documents of a specific type, for example a particular type of pathology report or resume, may vary significantly from organization to organization. Different organizations may use different keywords or punctuation in the section headings to mark sections of the same type. Therefore multiple, typically manually created, modules for detecting section types may be required to process documents for each organization.

III. SUMMARY OF THE INVENTION

In at least one embodiment, the present invention provides a method including receiving at least one document; identifying sections and associated section types within the at least one document; identifying sub-sections within the at least one document; defining new section types and new sub-section heading constructs when sections having known section types are identified; and learning new section heading keywords when sections having known section types are identified.

In at least one embodiment, the present invention provides a system including a document input unit; a processing unit coupled to said document input unit, the processing unit includes means for identifying document section heading candidates based on known visual indicators; means for identifying document section types based on known section type keywords; means for establishing whether section types can be determined, if section types can be determined, processing the section content based on the section type, and outputting the processed document; if section types cannot be determined, identifying section types based on known section type classifiers; means for establishing whether section types can be determined, if section types can be determined, outputting the section headings and types to a database, processing the section content based on the section type, and outputting the processed document; and if section types cannot be determined, outputting the sections having undetermined section types to a database; a storage unit coupled to the processing unit; and a document output unit coupled to said output unit.

In at least one embodiment, the present invention provides a computer program product including a computer useable medium that includes a computer readable program, wherein the computer readable program when executed on a computer causes the computer to receive at least one document; identify sections and associated section types within said at least one document; identify sub-sections within said at least one document; define new section types and new sub-section heading constructs; and learn new section heading keywords.

In at least one embodiment, the present invention provides a method, including receiving at least one document; identifying sections and associated section types within said at least one document based on known keywords and section type classifiers; identifying sub-sections within said at least one document based on sub-section heading constructs; defining new section types and new sub-section heading constructs when sections having unknown section types are identified; and learning new section heading keywords when known section types are identified by a section type classifier, instead of the existence of known section type keywords.

In at least one embodiment, the present invention provides an automatic means to process document collections that broadly conform to a similar set of section types but may utilize different section keywords and/or punctuation with the same type-based processing used for the original document collection.

IV. BRIEF DESCRIPTION OF THE DRAWINGS

The present invention is described with reference to the accompanying drawings, wherein.

Given the following enabling description of the drawings, the apparatus should become evident to a person of ordinary skill in the art.

V. DETAILED DESCRIPTION OF THE DRAWINGS

The present invention, in one or more exemplary embodiments, discloses a system and method for automatically processing electronic or "soft" text documents by utilizing visually distinguishable section headings within the document to partition the document based on section and content type. Hard documents may be scanned to create "soft" documents. In at least one exemplary embodiment, the present invention utilizes various criteria to identify sections and content types, including visual cues, keywords/punctuation, section classifiers, and sub-section heading constructs to segment a document into sections and, potentially, associated sub-sections for subsequent processing. In at least one exemplary embodiment, the system and method learns appropriate keyword mappings to section types from new document collections that have a similar set of section types but utilize different section keywords. The mappings facilitate processing documents from the new document collections with the same type-based processing used for the original document collection.

Figure 1:
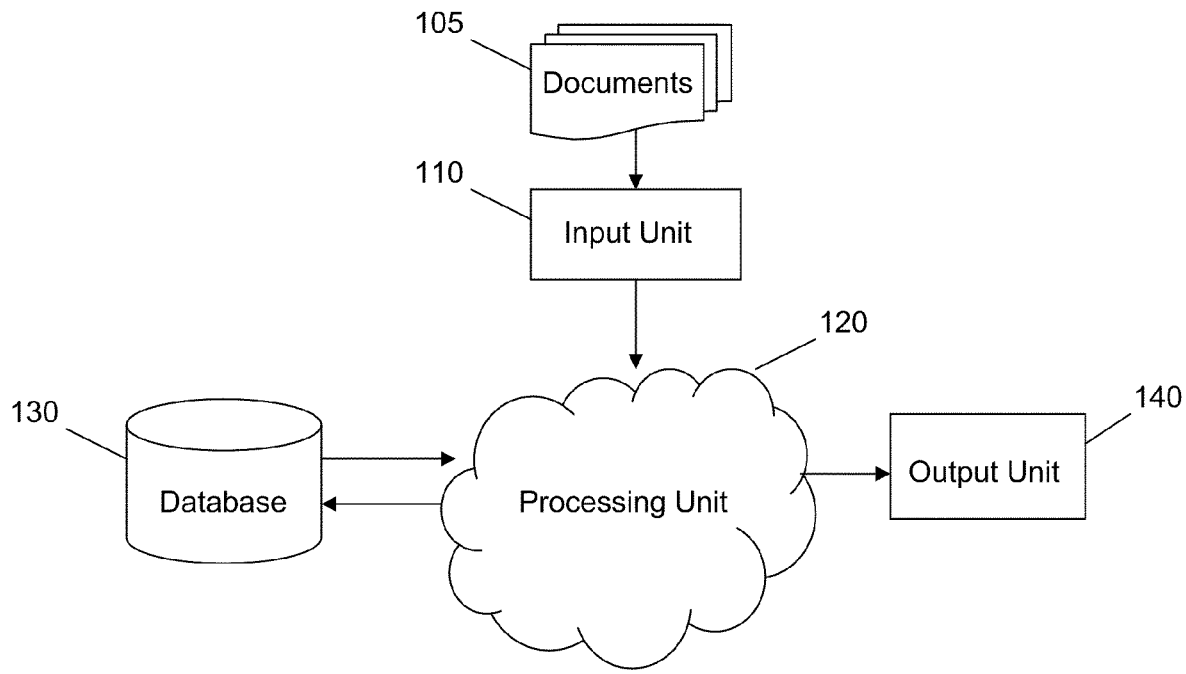
FIG. 1 illustrates a system for identifying document sections and section types for subsequent processing in accordance with an exemplary embodiment of the present invention.

FIG. 1 illustrates an exemplary embodiment of a system in accordance with the present invention. In at least one exemplary embodiment, the system 100 includes an input unit 110, a processing unit 120, one or more storage units 130, and an output unit 140. Input unit 110 receives a collection of documents 105 to be processed. Documents 105 may include numerous electronic documents containing a wide-range of document types and formats. Input unit 110 submits the received documents to processing unit 120 for processing. Processing unit 120 communicates with one or more storage units or databases 130 in order to process the documents 105. The processed documents are output to output unit 140.

Figure 2:
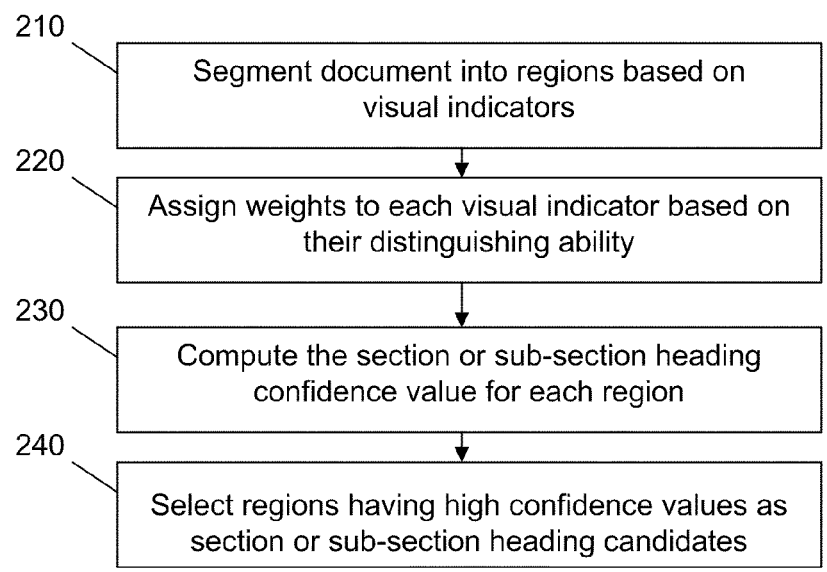
FIG. 2 illustrates an overview of a process for selecting section or sub-section heading candidates in accordance with an exemplary embodiment of the present invention.

FIG. 2 illustrates an exemplary process of selecting section or sub-section heading candidates in accordance with the present invention. In at least one exemplary embodiment, the process processes documents to identify document section and sub-section heading candidates. The section or sub-section heading candidates are identified as regions that are visually distinguishable based on known visual indicators or cues such as fonts and/or dividers that are stored in a database. The system utilizes these visual indicators to create a document visual indicator-region map that helps to identify section and sub-section heading candidates within the document. At 210, the process segments the document into regions according to visual indicators. At 220, the process assigns configurable weights to each visual indicator based on the distinguishing ability of the indicator. At 230, the process computes the section or sub-section heading confidence value for each region. At 240, the process selects regions having high confidence values as section or sub-section heading candidates. The section or sub-section heading candidates may be identified based on the regions having section or sub-section confidence values that meet a configurable requirement. These configurable requirements may be determined and set, for example, based on meeting a cumulative threshold value, or being amongst the top n confidence values for all regions in the document (where n is also configurable).

For each document, the visual indicators of interest and in effect are determined throughout the entire document. Each document is divided into non-overlapping regions such that neighboring regions do not have the exact same set of visual indicators in effect. Adjacent regions having the same set of visual indicators may be merged into one region. This division is utilized in order to construct a visual indicator-region map for each document such that section or sub-section heading candidates can be found.

Figure 3A:
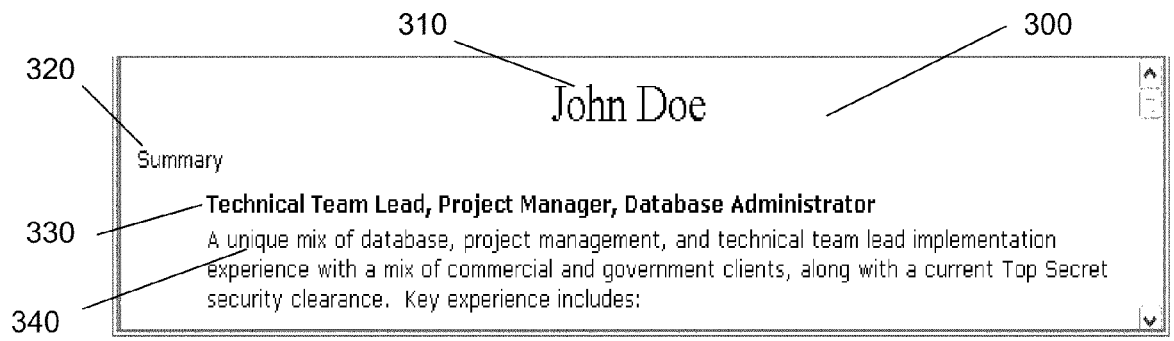
FIGS. 3A-3C illustrate a process for generating a document visual indicator-region map for selecting section or sub-section heading candidates in accordance with an exemplary embodiment of the present invention.
Figure 3B:
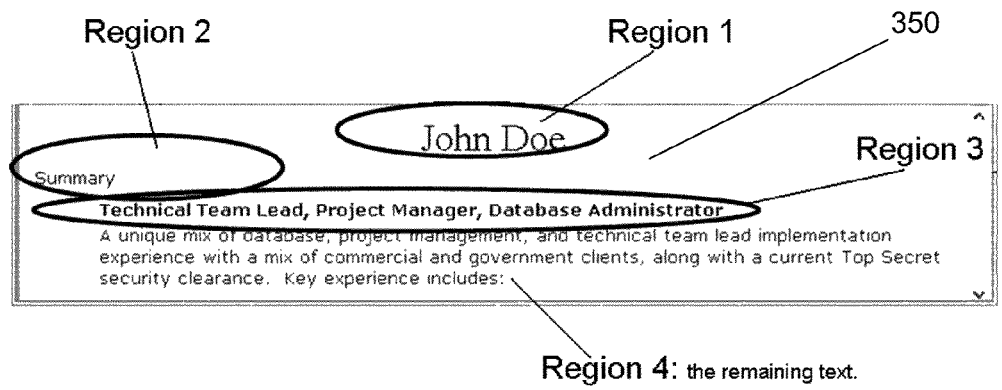
Figure 3C:
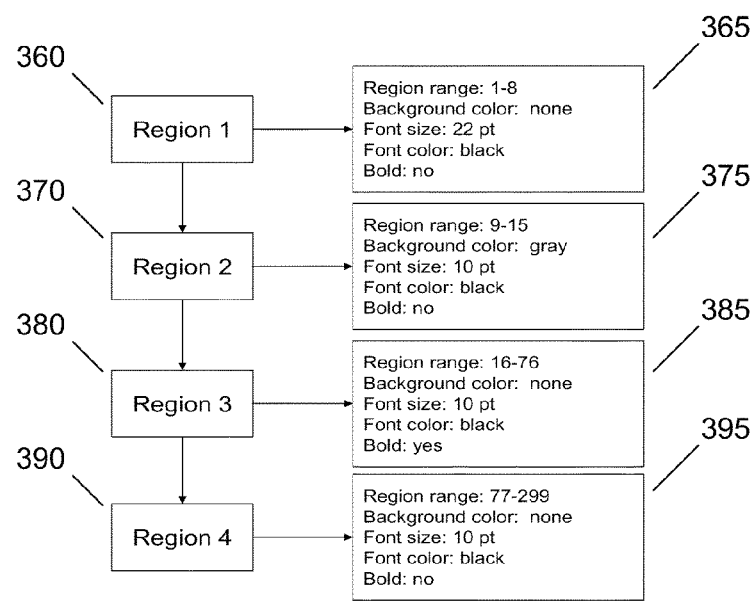

FIGS. 3A-3C illustrate an exemplary document and process for generating a document visual indicator-region map in accordance with an embodiment of the present invention. FIG. 3A illustrates a top portion of an example document 300 for use with the present invention. Document 300 may be, for example, an employee profile or resume that includes several distinct sections or sub-sections. These sections or sub-sections may include, for example, title 310, section heading 320, section sub-section heading 330, and sub-section text 340. The section or sub-sections 310, 320, 330 and 340 are typically good visual indicators. FIG. 3B illustrates an exemplary document visual indicator-region map 350 in accordance with the present invention. In creating the visual indicator-region map 350, document 300 is segmented into Regions 1-4 based on visual indicators 310, 320, 330 and 340 of interest and in effect which are collected for each region throughout the document. Adjacent regions having the same set of visual indicators may be merged into one region. The visual indicator-region map 350 is used to compute the section or sub-section heading confidence value for each Region 1-4.

In order to compute a section or sub-section heading confidence value, weights are assigned to each visual indicator 310, 320, 330 and 340 based on the degree or strength of the distinguishing ability of the visual indicator. FIG. 3C illustrates an example of a weight assignment process in accordance with an exemplary embodiment of the present invention. At 360, Region 1 is assigned a weight based on stated visual indicator strength 365. At 370, Region 2 is assigned a weight based on stated visual indicator strength 375. At 380, Region 3 is assigned a weight based on stated visual indicator strength 385. At 390, Region 4 is assigned a weight based on stated visual indicator strength 395. The confidence value for each Region is determined based on the visual indicator strength for that Region. The Regions having high confidence values are selected as good section and sub-section heading candidates.

The weights of visual indicators are preferably configured upon each installation, i.e., the processing of each new document collection. For example, in one installation, since the presence of background color is a good indicator of a section heading a background color associated with the region may be assigned a high weight, such as 5 on a scale of 0 or 1 to 5 (with 5 being the highest). In another installation, since font size is also a good indicator of a section heading a weight of 3 may be assigned to regions having the largest font size in the document, a weight of 2 assigned to regions with the second largest font size, and a weight of 1 assigned to regions with the third largest font size. Other examples may include, for example, a weight of 1 assigned to each unique color, font weight, or underline attributes. Based on these assigned values a section or sub-section heading confidence value indicating the sum of the weights of all the visual indicators in effect within the region is computed and assigned to the respective regions. The weights may be reconfigured or different templates may be used upon each installation.

These visual indicators and optional corresponding weights are stored in database of visual indicators 430 and used by process 400 to find section heading candidates. Visual indicators may also include attributes related to text font and/or layout dividers that render the document sections or regions visually distinguishable. The font attributes that make a document region visually distinguishable include, for example, font size, font color, font weight, background color, underlining, and capitalization. The list of font attributes to be considered is preferably configurable in each installation. The visual dividers that make a document region visually distinguishable include, for example, horizontal lines, spaces between sections or sub-sections, indentation levels and separation characters at the end of headings. These visual dividers may also be used in selecting the section and sub-section heading candidates. The visual indicators to be considered also preferably vary from installation to installation and are configured at each installation.

Figure 4:
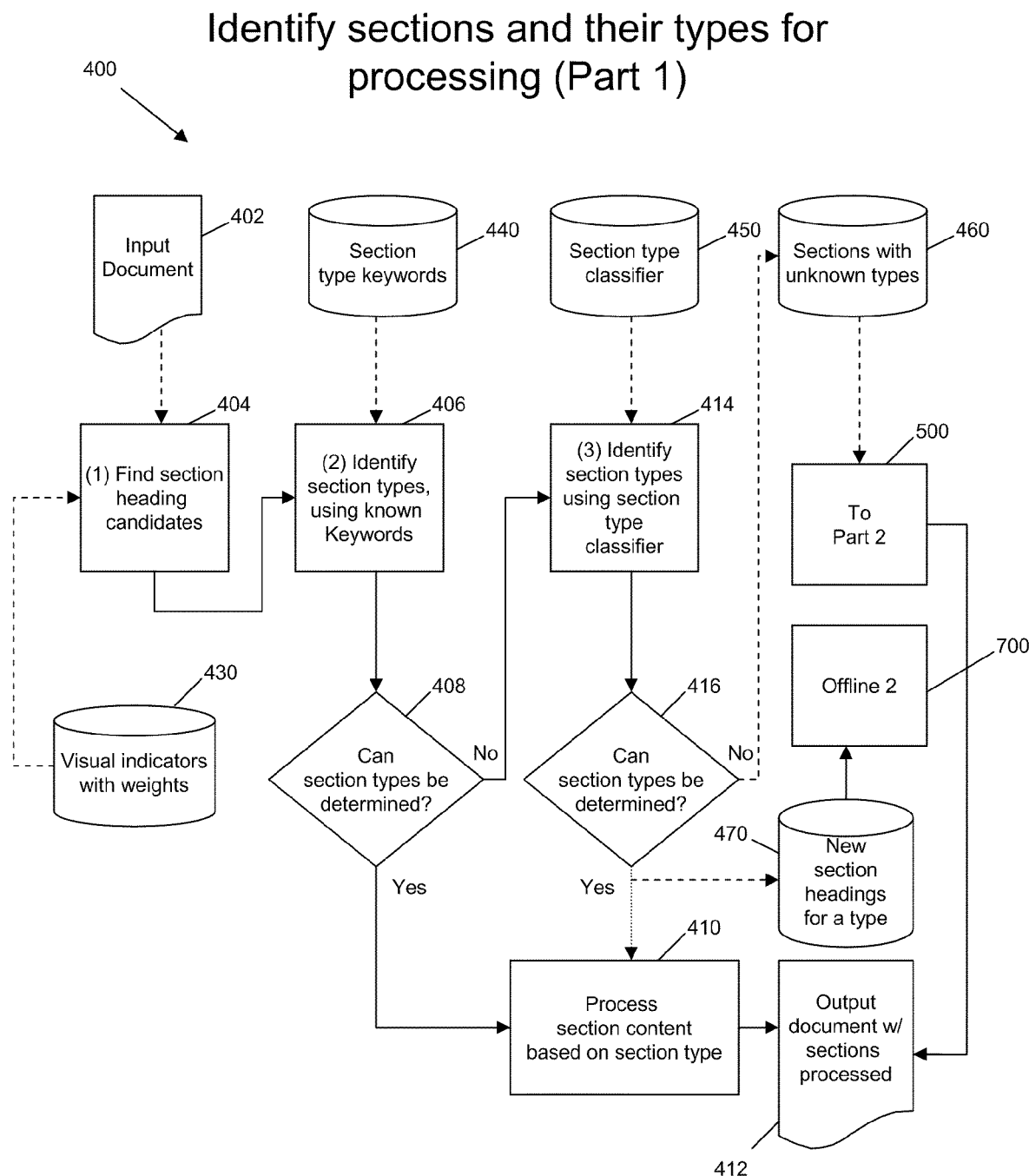
FIG. 4 illustrates a process for identifying document sections and section types for processing in accordance with an exemplary embodiment of the present invention.
Figure 5:
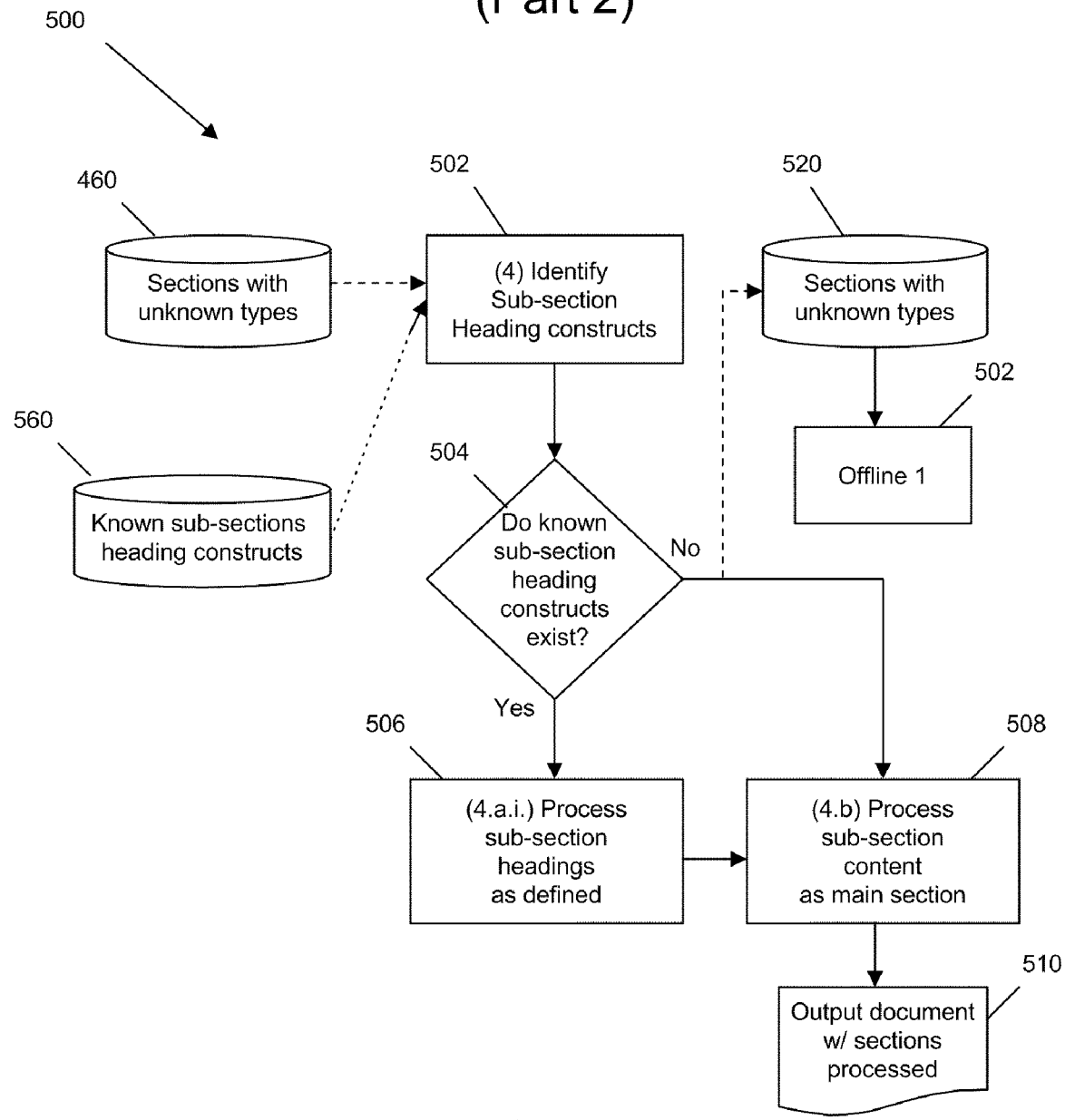
FIG. 5 illustrates a process for identifying document sub-sections for processing in accordance with an exemplary embodiment of the present invention.

In at least one exemplary embodiment, the present invention includes two key modules including an online component and an offline component. FIGS. 4 and 5 illustrate an exemplary online component, including Processes 400 and 500, that store an initial set of section types and associated keywords 440, a section type classifier 450, and optionally a set of sub-section heading constructs 560. The illustrated online component identifies sections, sub-sections, and section/sub-section types for processing. The illustrated online component functions to search for section heading candidates; identify section types via known keywords, within segments found by the process; determine section types via classification of section content—in a fashion complementary to the keyword step; and optionally, if appropriate, identify sub-section heading constructs. The offline component can be used to create an initial list of section types and associated keywords, a section classifier, and optionally a set of sub-section heading constructs to be used by the online component. The initial list of section types and associated keywords need not be complete as the system and process act to continuously improve the keyword list. The offline component and process act to continuously discover new section types and update the section type classifiers and keywords list accordingly.

FIG. 4 illustrates an embodiment according to the invention of a process for identifying sections and section types within a document. The process 400 begins at 402 by receiving a document for processing. At 404, the process identifies section heading candidates based on known visual cues within the document by utilizing a database 430 of weighted visual indicators. At 406, the process attempts to identify section types by utilizing known keywords from a database 440 of section type keywords. At 408, the process determines whether the identified section types can be determined. If "Yes", the process proceeds to 410 and the section content is processed based on section type. At 412, the document with processed sections is output. If "No", the process proceeds to 414 and attempts to identify section types by utilizing known section type classifiers from a database 450 of section type classifiers.

At 416, the process determines whether the section types can be determined. If "Yes", the process outputs the new section headings and types to database 470 for further processing, for example, by process 700, discussed in more detail with respect to FIG. 7. The process also proceeds to 410 and the section content is processed based on section type. At 412, the document with processed sections is output. If "No", the process outputs the sections with unknown types to a database 460 of unknown section types for further processing, for example, by process 500, discussed in more detail with respect to FIG. 5.

An initial set of section types and their keywords, a section classifier and optionally a set of sub-section heading constructs can be created via the offline component. The initial list of section types and their keywords need not be complete as the system in at least one embodiment acts to continuously improve the keywords list by discovering new section types, keywords, and section type classifiers. These newly discovered section types, keywords, and classifiers are used to continually update and refine the respective databases. Keywords in the newly discovered section heading for a "known" section type may be automatically extracted and incorporated into the existing list of section types. This may be performed, for example, by extracting the keywords that are not defined in a stop words list from the newly discovered section heading.

The process of identifying sub-section heading constructs, include determining whether the sub-section heading is of a known construct; if so, processing the sub-section heading as defined in the system; if not, the sub-section may be considered as part of the preceding main section of a known type; and/or optionally the sub-section heading is reviewed to discover and define new section types and new sub-section heading constructs; and processing the content of the sub-section as defined in the system or as a main section.

FIG. 5 illustrates an example of an embodiment of a process of the present invention for identifying subsections for processing. The process 500 begins at 502 by receiving sections with unknown types 460 from process 400 related to identifying sections and related section types, discussed above with respect to FIG. 400. At 502, the process attempts to identity sub-section heading constructs by utilizing known sub-section heading constructs 560. At 504, the process determines whether known sub-section heading constructs exist. If "Yes", the process proceeds to 506 and processes the sub-section headings as defined. At 508, the sub-section content is processed as the main section (providing that the general processing at the section level is in effect for the given sub-section type). At 510, the document is output with processed sections and sub-sections. If "No" (at 504), the process outputs sections with unknown types to a database 520 for further processing, for example, by process 600, discussed in further detail with respect to FIG. 6. The process also considers the section as part of the preceding main section of a known type, proceeds to 508 and performs the process as outlined above.

Figure 6:
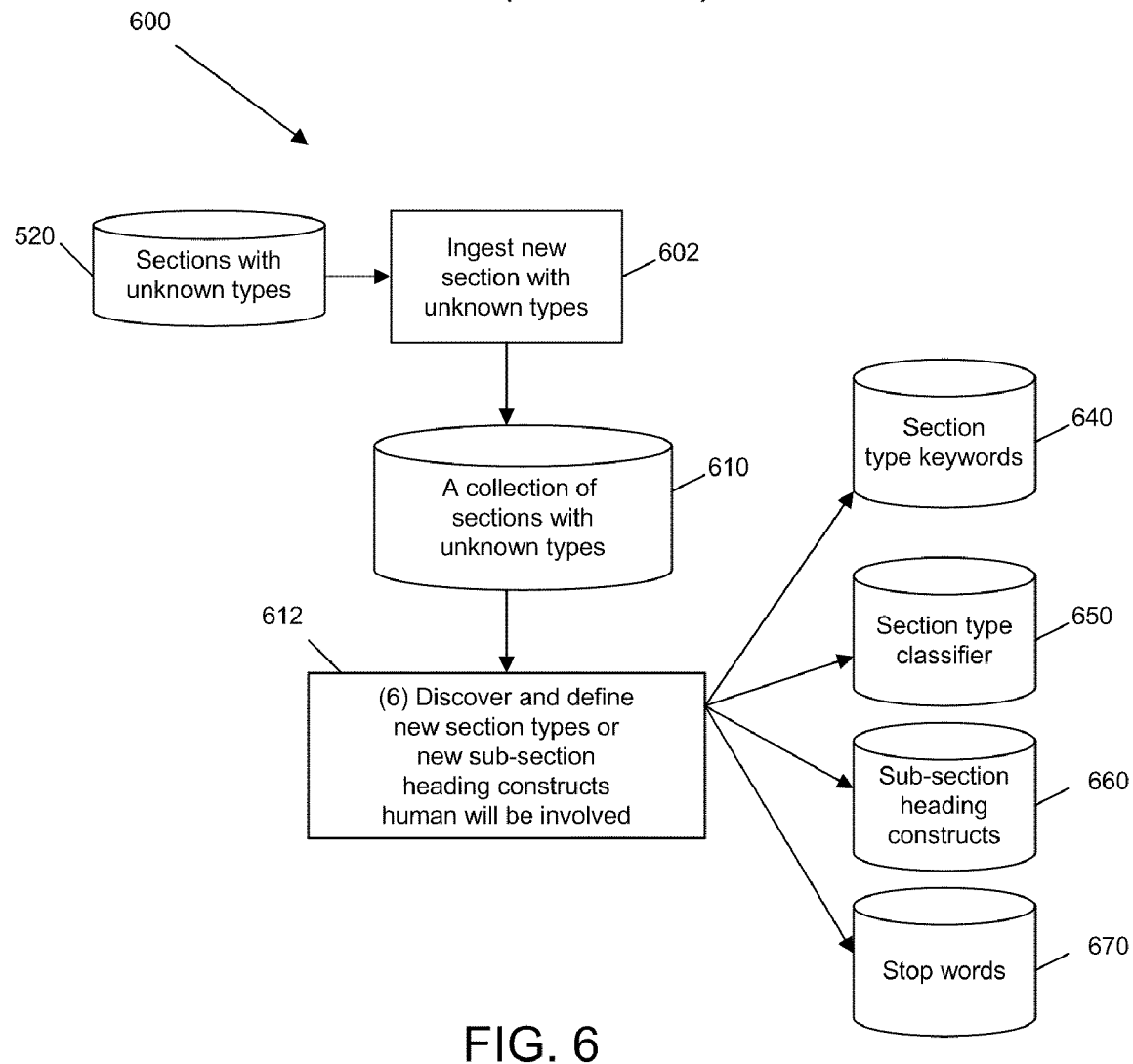
FIG. 6 illustrates a process for discovering and defining new document section types and new document sub-section heading constructs in accordance with an exemplary embodiment of the present invention.

In instances where process 500 yields sections with unknown types 520, those sections are submitted for further processing, for example, by process 600. FIG. 6 illustrates an example of an embodiment of process 600 for discovering and defining new section types and new sub-section heading constructs. The process 600 begins at 602 by receiving and outputting sections with unknown types 520 from process 500 into a database 610. At 612, a user reviews the collection of sections with unknown types to discover and define new section types or new sub-section heading constructs. New section type keywords are output to database 640. New section type classifiers are output to database 650. New sub-section heading constructs are output to database 660. New stop words are outputted to database 670.

In process 600, a clustering program, for example, may be used to cluster section content of unknown type accumulated by the process of identifying sub-section heading constructs. A user may then review the clustering results and determine whether any new section types need to be defined and incorporated into the existing known section types/headings. The user may also discover new sub-section heading constructs and define how to parse those new constructs.

A list of "stop words" can also be either automatically created or manually compiled in this step. The stop words includes commonly used words that rarely have an impact on the natural language text processing/analysis results. These words are filtered out in the processing/analysis since their inclusion requires more disk space and slows the process/analysis. Examples of stop words include, for example, "a", "an", "and", "the", "about", "how", "where", etc.

Figure 7:
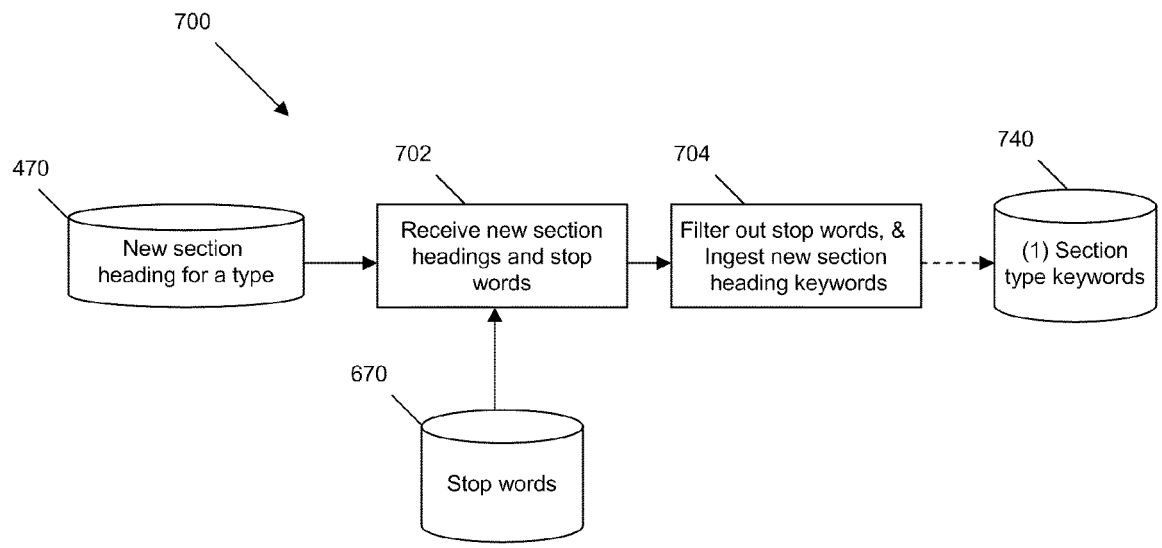
FIG. 7 illustrates a process for learning new document heading keywords in accordance with an exemplary embodiment of the present invention.

In instances where process 400 yields new section headings for a type 470, those new section heading are submitted for further processing by process 700. FIG. 7 illustrates an example of an embodiment of process 700 for learning new section heading keywords. At 702, the process receives new section headings 470 from process 400. Stop words 670 from process 600 is also received at 702. At 704, stop words are filtered out of the received section heading types and new section heading keywords are ingested, i.e., the keywords in the newly identified section headings for known section types are incorporated into the section type keywords databases 640 or 440. At 740, section type keywords are received to update a database of section type keywords. Known keywords databases 740, 640, and 440 are similar databases that expand in terms of section types in process 600 as more new section types are identified. These databases expand in terms of keywords for a given section type in process 700 as more new ways, i.e., new section headings, to describe the section type are identified.

The section types and associated keywords, section type classifiers, sub-section heading constructs, and stop words discovered through the various processes outlined herein are utilized to update and refine the respective databases that store these document elements. The processes disclosed herein allow documents of various types to be efficiently and reliably processed utilizing the textual content and layout of the documents, including visual indicators such as section and sub-section boundary indicators in addition to the known elements stored in the databases. The processes continually update and refine the databases of known elements and allow users to discover and define new elements for further updating and refinement.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A computer-implemented method, comprising:
   receiving at least one document;
   identifying sections and associated section types within said at least one document;
   identifying sub-sections within said at least one document;
   defining new section types and new sub-section heading constructs when sections having known section types are identified; and
learning new section heading keywords when sections having known section types are identified, wherein learning new section heading keywords comprises:
   receiving new section headings;
   receiving at least one stop word;
   filtering said at least one stop word from new section headings and ingesting new section heading keywords; and
   outputting section heading keywords.

2. The method according to claim 1, wherein said at least one document includes a collection of documents of different types and formats.

3. The method according to claim 1, wherein identifying sections and associated section types within said at least one document further comprises:
   identifying document section heading candidates based on known visual indicators;
   identifying document section types based on known section type keywords;
   establishing whether section types can be determined,
      if section types can be determined then performing the following:
         processing the section content based on the section type, and
         outputting the processed document; and
      if section types cannot be determined then performing the following:
         identifying section types based on known section type classifiers, and
         establishing whether section types can be determined;
            if section types can be determined then performing the following:
               outputting the section headings and types to a database,
               processing the section content based on the section type, and
               outputting the processed document; and
            if section types cannot be determined then performing the following:
               outputting the sections having undetermined section types to a database.

4. The method according to claim 3, wherein identifying document section heading candidates includes:
   segmenting said at least one document into regions based on visual indicators;
   assigning weights to each visual indicator based on the distinguishing ability of the visual indicator;
   computing a confidence value for each region; and
   selecting regions having high confidence values as section candidates.

5. The method according to claim 1, wherein identifying sub-sections within said at least one document further comprises:
   receiving document sections having undetermined section types;
   receiving known sub-section heading constructs;
   determining whether known sub-section heading constructs exist in the section having undetermined section types,
      if known sub-section heading constructs exist then performing the following:
         processing said sub-section heading constructs,
         processing said sub-section content as a main section, and
         outputting the processed document, and
      if no known sub-section heading constructs exist then performing the following:
         processing the content as a main section, and
         outputting the sections having undetermined section types to a database.

6. The method according to claim 1, wherein defining new section types and new sub-section heading constructs comprises:
   receiving sections with unknown types;
   discovering and defining new section types or new sub-section heading constructs; and
   outputting new section types and sub-section heading constructs to respective databases.

7. The method according to claim 6, wherein said new section types and sub-section heading constructs include section keywords, section type classifiers, sub-section heading constructs and stop words.

8. A system, comprising:
   a document input unit;
   a processing unit coupled to said document input unit, said processing unit includes:

means for identifying document section heading candidates based on known visual indicators;
means for identifying document section types based on known section type keywords;
means for establishing whether section types can be determined and performing the following:
if section types can be determined,
processing the section content based on the section type, and
outputting the processed document;
if section types cannot be determined,
identifying section types based on known section type classifiers;
means for establishing whether section types can be determined and performing the following:
if section types can be determined,
outputting the section headings and types to a database,
processing the section content based on the section type, and
outputting the processed document; and
if section types cannot be determined,
outputting the sections having undetermined section types to a database;
a storage unit coupled to said processing unit; and
a document output unit coupled to said output unit.

9. A system according to claim 8, wherein said processing unit further includes:
means for segmenting documents into regions based on visual indicators;
means for assigning weights to said visual indicators based on the distinguishing ability to the visual indicator;
means for computing a confidence value for each region; and
means for selecting regions having high confidence values as section or sub-section heading candidates.

10. A system according to claim 8, wherein said processing unit further includes:
means for receiving document sections having undetermined section types;
means for receiving known sub-section heading constructs;
means for determining whether known sub-section heading constructs exist in the section having undetermined section types and performing the following:
if known sub-section heading constructs exist,
processing said sub-section heading constructs,
processing said sub-section content as a main section, and
outputting the processed document, and
if no known sub-section heading constructs exist,
processing the content as a main section, and
outputting the sections having undetermined section types to a database.

11. A system according to claim 8, wherein defining new section types and new sub-section heading constructs comprises:
means for receiving sections with unknown types;
means for discovering and defining new section types or new sub-section heading constructs; and
means for outputting new section types and sub-section heading constructs to respective databases.

12. The system according to claim 11, wherein said new section types and sub-section heading constructs include section keywords, section type classifiers, sub-section heading constructs and stop words.

13. A computer program product comprising a computer useable medium including a computer readable program, wherein the computer readable program when executed on a computer causes the computer to:
receive at least one document;
identify sections and associated section types within said at least one document;
identify sub-sections within said at least one document;
define new section types and new sub-section heading constructs; and
learn new section heading keywords, wherein when learning new section heading keywords the computer readable program further causes the computer to:
receive new section headings;
receive at least one stop word;
filter said at least one stop words from new section headings and ingesting new section heading keywords; and
output section heading keywords.

14. A computer program product according to claim 13, wherein the computer readable program further causes the computer to:
identify document section heading candidates based on known visual indicators;
identify document section types based on known section type keywords;
establish whether section types can be determined,
if section types can be determined then causing the computer to:
process the section content based on the section type, and
output the processed document; and
if section types cannot be determined then causing the computer to:
identify section types based on known section type classifiers, and
establish whether section types can be determined;
if section types can be determined then causing the computer to:
output the section headings and types to a database,
process the section content based on the section type, and
output the processed document; and
if section types cannot be determined then causing the computer to:
output the sections having undetermined section types to a database.

15. A computer program product according to claim 14, wherein when identifying document section heading candidates the computer readable program further causes the computer to:
segment said at least one document into regions based on visual indicators;
assign weights to each visual indicator based on the distinguishing ability of the visual indicator;
compute a confidence value for each region; and
select regions having high confidence values as section candidates.

16. A computer program product according to claim 13, wherein when identifying sub-sections within said documents the computer readable program further causes the computer to:
receive document sections having undetermined section types;
receive known sub-section heading constructs;

determine whether known sub-section heading constructs exist in the section having undetermined section types and further causing the computer to:
  if known sub-section heading constructs exist,
    process said sub-section heading constructs,
    process said sub-section content as a main section, and
    output the processed document, and
  if no known sub-section heading constructs exist,
    processing the content as a main section, and
    output the sections having undetermined section types to a database.

17. A computer program product according to claim 13, wherein when defining new section types and new sub-section heading constructs the computer readable program further causes the computer to:
  receive sections with unknown types;
  discover and define new section types or new sub-section heading constructs; and
  output new section types and sub-section heading constructs to respective databases.

18. A computer-implemented method, comprising:
  receiving at least one document;
  identifying sections and associated section types within said at least one document based on known keywords and section type classifiers;
  identifying sub-sections within said at least one document based on sub-section heading constructs;
  defining new section types and new sub-section heading constructs when sections having unknown section types are identified; and
  learning new section heading keywords when known section types are identified by a section type classifier, instead of the existence of known section type keywords, wherein learning new section heading keywords comprises:
    receiving new section headings;
    receiving at least one stop word;
    filtering said at least one stop word from new section headings and ingesting new section heading keywords; and
    outputting section heading keywords.

19. The method according to claim 18, wherein identifying sub-sections within said at least one document further comprises:
  receiving document sections having undetermined section types;
  receiving known sub-section heading constructs;
  determining whether known sub-section heading constructs exist in the section having undetermined section types,
    if known sub-section heading constructs exist then performing the following:
      processing said sub-section heading constructs,
      processing said sub-section content as a main section, and
      outputting the processed document, and
    if no known sub-section heading constructs exist then performing the following:
      processing the content as a main section, and
      outputting the sections having undetermined section types to a database.

20. The method according to claim 18, wherein defining new section types and new sub-section heading constructs comprises:
  receiving sections with unknown types;
  discovering and defining new section types or new sub-section heading constructs; and
  outputting new section types and sub-section heading constructs to respective databases.

21. The method according to claim 20, wherein said new section types and sub-section heading constructs include section keywords, section type classifiers, sub-section heading constructs and stop words.

* * * * *